United States Patent
Burri et al.

(10) Patent No.: US 8,657,262 B2
(45) Date of Patent: Feb. 25, 2014

(54) DEVICE AND METHOD FOR FOAMING A LIQUID FOODSTUFF, ESPECIALLY MILK

(75) Inventors: Adrian Burri, Bubikon (CH); Andreas Kaiser, Zurich (CH); Heinz Vetterli, Wangen (CH); Mariano Turi, Zurich (CH)

(73) Assignee: Niro-Plan AG, Aarburg (CH)

( * ) Notice: Subject to any disclaimer, the term of this patent is extended or adjusted under 35 U.S.C. 154(b) by 340 days.

(21) Appl. No.: 12/885,600

(22) Filed: Sep. 20, 2010

(65) Prior Publication Data

US 2011/0070349 A1 Mar. 24, 2011

(30) Foreign Application Priority Data

Sep. 18, 2009 (DE) .......................... 10 2009 041 809

(51) Int. Cl.
*B01F 3/04* (2006.01)

(52) U.S. Cl.
USPC ............... 261/26; 261/76; 426/474; 99/323.1

(58) Field of Classification Search
USPC ............... 261/26, 76; 99/453, 323.1; 426/474
See application file for complete search history.

(56) References Cited

U.S. PATENT DOCUMENTS

| 6,099,878 | A * | 8/2000 | Arksey | 426/231 |
| 7,527,818 | B2 * | 5/2009 | Dirren | 426/474 |
| 8,069,778 | B2 * | 12/2011 | Gierth et al. | 99/452 |

FOREIGN PATENT DOCUMENTS

| DE | 1965852 | 7/1970 |
| DE | 602005004032 | 12/2008 |
| DE | 202008016375 | 4/2009 |
| EP | 0243326 | 10/1987 |
| EP | 1593330 | 11/2005 |
| WO | 2008083941 | 7/2008 |

* cited by examiner

*Primary Examiner* — Robert A Hopkins
(74) *Attorney, Agent, or Firm* — Volpe and Koenig, P.C.

(57) ABSTRACT

A device for foaming a liquid foodstuff, especially milk, is provided including a pump (2) that has, on the suction side, a feed line (3) that can be connected in a fluid-conducting way to a storage container for the liquid foodstuff. An air feed line (3a) by which air can be fed to the foodstuff is arranged in a path of flow of the liquid foodstuff on the suction side of the pump (2) and, a throttle (4a) is arranged in the path of flow of the foodstuff on the downstream side of the pump (2). The air feed line (3a) includes an air valve (3b) that can be controlled by a control unit (9) and the air valve (3b) is an intermittent air valve (3b) having at least one state with high air flow and one state with comparatively lower air flow and/or with no air flow can be specified selectively by the control unit (9), and the control unit (9) and air valve (3b) are constructed to interact such that the average air flow of the air valve can be controlled through repeated switching between the at least two states of the air valve.

15 Claims, 1 Drawing Sheet

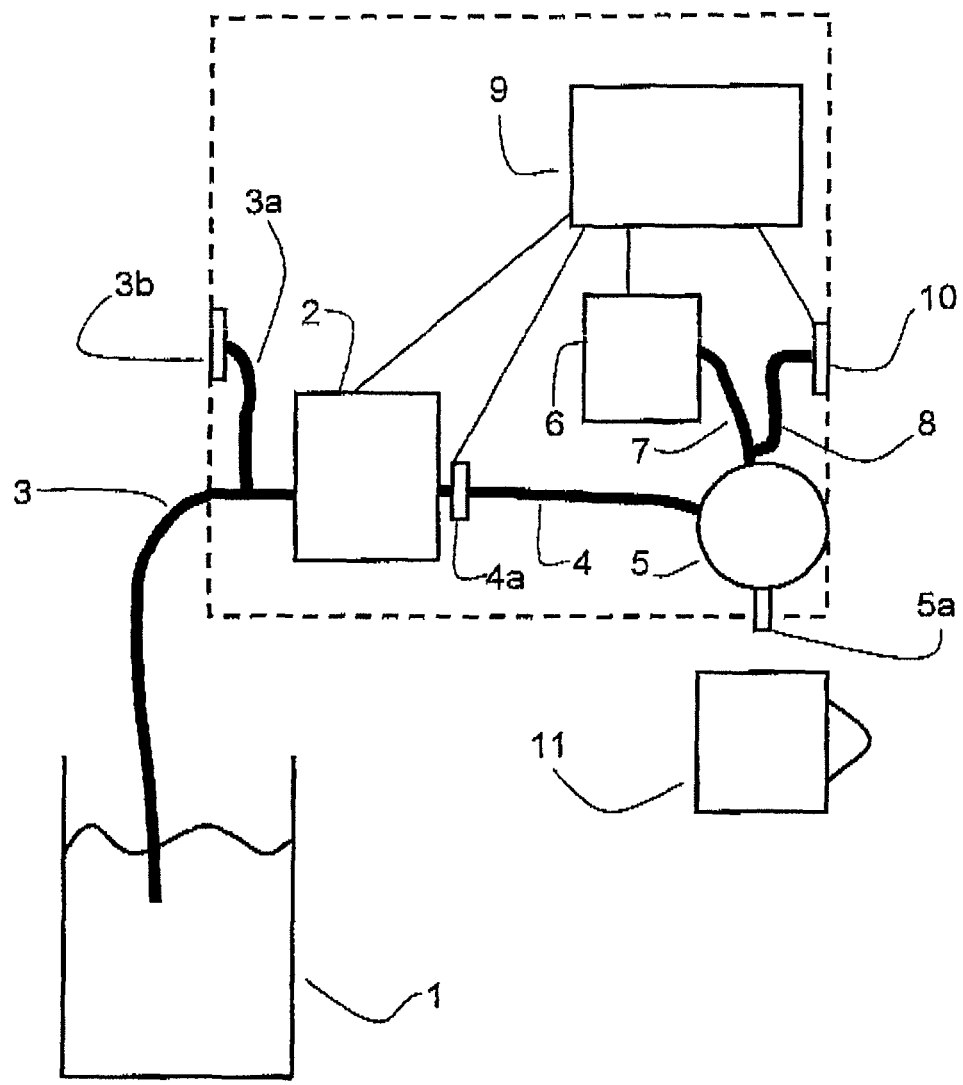

DEVICE AND METHOD FOR FOAMING A LIQUID FOODSTUFF, ESPECIALLY MILK

CROSS-REFERENCE TO RELATED APPLICATIONS

This application claims the benefit of German Patent Application No. 10 2009 041 809.1, filed Sep. 18, 2009, which is incorporated herein by reference as if fully set forth.

BACKGROUND

The invention relates to a device and a method for foaming a liquid foodstuff, especially milk.

For foaming a liquid foodstuff, devices are known in which the liquid foodstuff, steam, and air are mixed in a foaming chamber, so that the liquid foodstuff is foamed and can be discharged by an outlet.

Especially for coffeemakers, it is known, for example, for preparing cappuccino, to foam milk with such devices. Typically, the air and/or milk is suctioned here by the Venturi effect due to the steam flow.

For example, in EP 00 243 326 A2, a device for foaming milk is described in which milk, steam, and air feed lines are connected to a foaming chamber. Milk and air are suctioned by the Venturi effect due to the steam flow. The device has hand-activated throttle valves for regulating the air flow and the milk flow.

Due to the great popularity of mixed coffee drinks, especially coffee-milk mixed drinks, devices for foaming liquid foodstuff are being used more and more. Especially in fine dining, high demands are placed on the quality of the foam being produced.

Furthermore, cold mixed drinks that contain foamed liquid foodstuff are also becoming more and more in demand. For producing cold milk foam, it is known from WO 2008/083941 A1 to feed milk by a pump to a throttle and then to selectively discharge directly via an outlet for producing cold milk foam or to first lead through a flow heater and then to discharge via an outlet for producing warm milk foam.

Also in the case of cold milk foam it is desired that this foam features a uniform fine porosity and thus stability. Due to the different desired foam types under different starting materials, such as, for example, milk at different temperatures or fat contents, as well as other liquid foodstuff with different viscosities, the production of the desired foam types has proven to be difficult.

SUMMARY

Thus, the invention is based on the objective of creating a device and a method for foaming liquid foodstuff, wherein this device simplifies the foaming of the liquid foodstuff for the user for producing cold foam of a desired consistency, especially with respect to different mixed foam consistencies and/or different starting parameters of the liquid foodstuff, such as, for example, temperature, fat content, or viscosity. Furthermore, the device according to the invention should be distinguished by a robust and economical configuration.

These objectives are met by a device and also a method according to the invention. Advantageous constructions of the device are provided below and in the claims and advantageous implementations of the method are also provided below and in the claims.

The device according to the invention for foaming a liquid foodstuff, especially milk, comprises a pump that has, on the suction side, a feed line that can be connected in a fluid-conducting way to a storage container for the liquid foodstuff. On the suction side of the pump, in the path of flow of the liquid foodstuff there is an air feed line by which air can be fed to the foodstuff. Furthermore, downstream of the pump, in the path of flow of the foodstuff there is a throttle. As already known from the prior art, for producing cold foam, air is fed to the liquid foodstuff on the suction side of the pump and, downstream of the throttle, an expansion of the foodstuff-air mixture takes place on the pressure side of the pump, so that cold foam is produced.

It is essential that, in contrast to known devices, the device according to the invention comprises a control unit and the air feed line comprises an air valve that can be controlled by the control unit. The air valve is an intermittent air valve, that is, through the use of the control unit, selectively at least one state with a high air flow and one state with an air flow that is lower comparatively and/or with no air flow can be specified. The control unit and air valve are constructed to interact such that the average air flow of the air valve can be controlled by repeated switching between the at least two states of the air valve.

The device according to the invention thus has, first, the difference with the known device such that an air valve in the air feed line can be controlled by a control unit. Herewith, the air feed can be controlled automatically, so that, for example, a control can be easily specified by the control unit as a function of the starting product and/or the temperature or other parameters of the starting product and/or as a function of the desired type and consistency of the foam to be produced.

Second, the device according to the invention differs in that the air flow of the air valve is controlled through repeated switching between at least two states of the air valve. Thus, the air flow is not controlled by a throttle valve, instead switching is performed repeatedly between at least two states of the air valve with different air flows, so that, on average, the desired air flow is produced.

Studies of the applicant have shown that, in particular, the previously noted type of control of air flow allows a significantly more exact and simpler, realizable high-precision control of the desired air flow relative to the use of throttle valves. In addition, the "clocking" of the air flow through the repeated switching between the at least two states of the air valve has a positive effect on the foam development. Especially for the production of cold milk foam, the addition of an exact dose of air is essential, because, in comparison with the production of hot foam, another control parameter, such as, for example, the heating temperature or temperature and quantity of supplied steam, is not available for the regulation. Furthermore, the clocking of the air shows a positive effect on the foam formation, especially for the production of cold milk foam.

Advantageously, the air valve has two states, one essentially closed state and one opened state. Advantageously, the first state is a completely closed state, that is, in which no air flows through the air valve. Depending on the construction or due to the switching times, however, a minimal air flow can be realized even in the "closed" state. The average air flow of the air valve is here controlled through repeated switching between the closed and opened states. In particular, the use of solenoid valves is advantageous because such valves are already available in different embodiments and allow high switching frequencies between closed and open states.

In one advantageous construction, the control unit and air valve are constructed to interact such that the average air flow of the air valve can be controlled by specifying a switching frequency at which switching is performed between the at least two states of the air valve and/or by specifying a pulse-duty factor between the at least two states. The pulse-duty factor describes the time ratio in which, after repeated switching, one state of the air valve is compared with the other states. In the case of only two switching states, the pulse-duty factor is typically specified in percent DC (duty cycle). A pulse-duty factor of 5% DC thus means that, in the case of an air valve with an open and a closed state, on average the air valve is opened for 5% of the time period and the air valve is closed for 95% of the time period.

Studies of the applicant have shown that, especially by specifying the pulse-duty factor, an exact specification of different foam consistencies, especially different foam volumes for the same total weight of the discharged foodstuff can be achieved. With the device according to the invention, by specifying the pulse-duty factor by the control unit, the consistency of the produced foam, especially the average size of the foam pores can be specified in a simple and precisely reproducible way.

Studies of the applicant have shown that advantageously the air valve and control unit are constructed such that, through the use of the control unit, a switching frequency can be specified in the range from 1 Hz to 50 Hz, advantageously in the range from 1 Hz to 20 Hz, further advantageously in the range from 5 to 15 Hz, especially a frequency of approximately 10 Hz. Because typical valves, in particular, solenoid valves, exhibit the best foaming results at the specified frequency ranges, an operation of a solenoid valve at a frequency of approximately 10 Hz is thus advantageous.

As mentioned above, in particular, the control of a desired foam consistency by specifying the pulse-duty factor is advantageous. Studies of the applicant have shown that advantageously the air valve and control unit are constructed such that, by use of the control unit, a pulse-duty factor between the opened and closed state of the air valve can be specified in the range from DC 2% to DC 80%, advantageously in the range from DC 5% to DC 60%. Furthermore, a pulse-duty factor between the opened and closed state of the air valve can be advantageously specified in the range from DC 2% to DC 90%, advantageously from DC 5% to DC 70%. Through the ranges named above, an optimization of the specified value ranges is given for the pulse-duty factor and the change in the foam consistency, especially the foam volume as a function of the change in the pulse-duty factor.

The air is fed advantageously by the Venturi effect. For this purpose, the air feed line is advantageously constructed and/or arranged such that air can be fed by the Venturi effect due to the flow of the liquid foodstuff.

Active air feeding likewise lies in the scope of the invention, for example, by a pump. Passive air feeding by the Venturi effect, however, has the advantage that no additional components are needed for the air feeding.

Thus, through the use of the device according to the invention, on one hand, different foam consistencies can be achieved and, on the other hand, specified foam consistencies for different starting media with different temperatures and/or viscosities or other parameters can be achieved.

Advantageously, the control unit is constructed so that it is programmable, so that for different beverage products, parameters for the foam production can be stored in the control unit and/or can be specified permanently at the factory. These parameters advantageously comprise one or more parameters from the group of switching frequency, pulse-duty factor, foaming time period, foam quantity, and/or mixed coffee quantity, as well as course of the beverage preparation, i.e., one or more times and/or time periods of the addition of the coffee and one or more times and/or time periods of the addition of the foam. In this way, the fully automatic sequence for the production of different beverage products can be specified, for example, the sequence for adding coffee and foam, the corresponding quantity ratios, as well as the parameters for the foam production. Advantageously, the control unit is therefore also connected to a device for producing coffee, so that producing and/or dispensing coffee can likewise be controlled by the control unit.

Advantageously, the control unit thus comprises a storage unit for storing at least one foaming mode, wherein the foaming mode comprises a switching frequency and/or a pulse-duty factor. By specifying a foaming mode, due to the exact control of the air feeding, a constant foam consistency can thus be guaranteed. Furthermore, if several foaming modes are stored, a production of different foam consistencies and/or a use of different liquid foodstuffs or liquid foodstuffs with different parameters is possible that is particularly simple for the user. Advantageously, the device therefore comprises an input unit by which the user selects a specified foaming mode, so that the control unit controls the device with the parameters stored for this foaming mode. Alternatively or additionally, it is advantageous that the control unit is connected to at least one detector, for example, for measuring the temperature and/or the fat content of the liquid foodstuff to be foamed. Depending on the measurement data of the detector, the control unit performs an allocation to a corresponding foaming mode or to a group of corresponding foaming modes, so that, independent of the user and independent of, for example, temperature and/or fat content of the liquid foodstuff, a foam with the desired consistency is always produced. It also lies in the scope of the invention that parameters of the liquid foodstuff, such as, for example, temperature, fat content, and/or viscosity are input manually by the user through an operating unit and the control unit selects a corresponding foaming mode or a group of corresponding foaming modes.

For the allocation of parameters to a group of foaming modes, the selection of the foaming mode to be used from this group is performed advantageously by the user by a control unit.

The specification of the foaming modes is performed advantageously at the factory, but the possibility that the user stores his own foaming modes or changes existing foaming modes also lies in the scope of the invention.

Through the control of the air flow by a control unit and especially the high-precision control for the device according to the invention it is further possible to change the consistency of the foam in a controlled manner during the foaming process. Thus, for example, a foam with continuously changing consistency, especially the average size of the foam pores and/or automatically a layer system made from foam layers with different consistency, especially different average sizes of the foam pores, can be produced.

Advantageously, at least one foaming mode therefore has two different values for the switching frequency and/or the pulse-duty factor, wherein a time period for its use is allocated to each value pair. Advantageously, for one foaming mode, a constant switching frequency is specified and several pulse-duty factors changing in steps or continuously according to specified time periods. In this way, the automatic production of visually interesting and flavorful foam-layer systems is possible.

Advantageously, the control device is connected to the pump and these are constructed to interact such that the feed quantity of the pump can be controlled by means of the control device. In this way, not only an exact air flow of the air valve, but also an exact feed of the liquid foodstuff, in particular, also a varying feed quantity can be specified for a desired foam product.

Studies of the applicant have shown that, in particular, the use of a gearwheel pump is advantageous for feeding the liquid foodstuff, because in the case of a gearwheel pump, the feed quantity can be controlled in an especially reliable way. Furthermore, a gearwheel pump causes a uniform mixing of the foodstuff-air mixture. Likewise, the use of other pumps lies in the scope of the invention, in particular, magnetic piston pumps have also proven to be good in use in the device according to the invention.

Advantageously, a foaming mode therefore comprises a foaming time period for the entire foaming process, especially also a foaming time period and at least one pump capacity for the pump.

The air valve is advantageously constructed such that the air flow of the air valve can be controlled by electrical control signals.

The throttle arranged downstream of the pump in the path of flow of the foodstuff can be constructed as a nozzle or as a throttle valve. Advantageously, the throttle is constructed as a controllable throttle, in particular, as a controllable throttle valve and is connected to the control unit such that at least two different flow cross sections for the liquid foodstuff flowing through the throttle can be specified selectively by means of the control unit.

In this way, for the production of cold milk foam, the flow cross section of the throttle and thus the expansion behavior of the foodstuff-air mixture downstream of the throttle can be selectively controlled by means of the control unit.

Advantageously, the previously listed foaming modes stored in the storage unit therefore also comprise an opening state and/or flow cross section of the throttle.

In another advantageous embodiment, the device according to the invention also comprises a foaming chamber and a steam feed line. The steam feed line is connected in a fluid-conducting way to the foaming chamber—optionally by means of additional feed lines. Furthermore, the throttle is connected in a fluid-conducting way to the foaming chamber downstream of the flow path of the liquid foodstuff.

This advantageous embodiment of the device according to the invention has the advantage that warm or cold foam can be produced selectively:

For producing cold foam, no steam is fed into the foaming chamber and the production is performed as described above, wherein the cold foam is discharged from an outlet arranged downstream of the foaming chamber. For producing warm milk foam—like in the devices known from the prior art—the foaming of a mixture made from liquid foodstuff, air, and steam is performed in the foaming chamber and then the foam heated by the feeding of steam is discharged via an outlet arranged downstream of the foaming chamber. The feeding of air is performed here advantageously as described above by use of the intermittent air valve on the suction side of the pump.

This embodiment of the device according to the invention has the advantage that cold or warm foam can be produced selectively with an especially simple and therefore economical and robust construction. In particular, for producing warm foam, components that were used before and control parameters can be used, because the foaming in the foaming chamber is realized by the supply of steam via the steam feed line in a known manner. In contrast, for producing cold foam, steam is not supplied; nevertheless, the discharge of the cold milk foam also takes place via the foaming chamber. Thus, in particular, no parallel line sections are needed, so that a simplified, economical, less error-susceptible, and easier to clean construction is achieved.

In particular, it is advantageous to also construct the throttle so that it can be controlled as described above and to construct the control unit such that for producing warm milk foam, the throttle is opened, i.e., it has no or only little flow resistance, while for producing cold milk foam, the throttle has a comparatively smaller cross section that leads to an expansion of the air-foodstuff mixture downstream of the throttle and therefore leads to the formation of foam.

In this way, the advantage is produced that, for producing warm milk foam, the load on the pump and the necessary energy consumption of the pump are reduced by the lower flow resistance for an opened throttle and the warm milk foam is produced advantageously exclusively or essentially in the foaming chamber in a known way. In contrast, for producing cold milk foam, the optimal flow resistance for this case can be specified by a corresponding setting of the throttle by the control unit.

Advantageously, the advantageous embodiment described above also comprises, in addition to the foaming chamber and steam feed line, a second air feed line that can be selectively closed by a second air valve. The second air feed line is connected in a fluid-conducting way to the foaming chamber—optionally by additional feed lines. The second air valve is constructed to interact with the control unit such that, by means of the control unit, the air feeding can be specified selectively by the second air feed line.

For this advantageous embodiment, air can thus be fed selectively on the suction side of the pump via the air valve and/or via the second air valve on the pressure side of the pump. This has the advantage that, especially for producing warm milk foam, known methods and parameters can be used. In particular, in a known way, on one hand, milk and, on the other hand, a steam-air mixture can be used in the foaming chamber for producing warm milk foam.

Advantageously, cold milk foam is produced in that air is fed exclusively via the air feed line arranged on the suction side of the pump. Warm milk foam is produced advantageously in that air is fed exclusively via the second air feed line on the pressure side of the pump.

Advantageously, the second air feed line is constructed such that air can be suctioned by the Venturi effect. In particular, the second air feed line is advantageously connected to the steam feed line such that air is suctioned due to the steam flow.

Advantageously, in the embodiment of the device according to the invention, for producing warm or cold milk foam, the second air valve and/or the steam feeding can be controlled by means of the control unit. Furthermore, the previously mentioned foaming modes stored in the storage unit advantageously also comprise corresponding parameters with respect to the steam feed flow and the air feed flow via the second air feed line.

Furthermore, it is advantageous that the second air valve is constructed analogous to the first air valve or an advantageous construction of the air valve arranged on the suction side of the pump, i.e., both the first and also second air valves are intermittent air valves. In this way the advantages by the use of intermittent air valves are realized both for producing warm foam and also for producing cold foam. Likewise it is advantageous to construct the control of the second air valve analogous to the control of the air valve arranged on the suction side of the pump or an advantageous embodiment of this control, in particular, to specify a switching frequency and a pulse-duty factor.

For the construction of the device according to the invention for producing cold and warm milk foam, both types of foam are advantageously discharged via the same outlet.

For producing steam, the device advantageously comprises a steam generator. Here, it is also especially advantageous if the steam generator is connected to the control unit and is constructed to interact with this control unit so that at least the starting and end times of the supply of steam can be controlled. In particular, it is advantageous that the supplied steam quantity can be controlled by means of the control unit. Here, all of the parameters for the foam production with respect to supply quantity of the liquid foodstuff, steam supply, and air supply can be specified by the control unit and a desired foam quality is thus reproducible to a large degree.

Advantageously, here the foaming mode also comprises a steam quantity and/or a time period for the supply of steam.

Advantageously, the steam feed line opens directly into the foaming chamber.

The air valve and/or the second air valve is advantageously constructed such that the air flow of the air valve can be controlled by electrical control signals.

Advantageously, the device according to the invention comprises a cooling chamber for holding and cooling the liquid foodstuff. In particular, it is advantageous if the device according to the invention is integrated into a known coffeemaker, in particular, a fully automatic coffeemaker.

The construction of the device according to the invention as an add-on device for a coffeemaker also lies in the scope of the invention. Here it is advantageous if the device according to the invention comprises a control connection for connecting the control unit to a control unit of the coffeemaker and the control unit is constructed such that, as a function of control signals of the coffeemaker, foam is produced corresponding to the control signals. In this case, the central control is thus realized from the coffeemaker that demands foam in consistencies that can be specified by control signals, when needed (i.e., as a function of the beverage produced by the coffeemaker). Advantageously, the foam is discharged via an outlet of the coffeemaker.

The invention further comprises a method for foaming a liquid foodstuff, especially milk. Here, the liquid foodstuff is fed by a pump that has, on the suction side, a feed line connected in a fluid-conducting way to a storage container for the liquid foodstuff. Furthermore, on the suction side of the pump, air is fed to the foodstuff by an air feed line arranged in the path of flow of the liquid foodstuff and the liquid foodstuff is guided through a throttle downstream of the pump. It is essential that an intermittent air valve of the air feed line is repeatedly switched between at least one state with high air flow and one state with comparatively lower air flow and/or with no air flow by a control unit for controlling the average air flow of the air valve.

Advantageously, the method according to the invention is performed by a device according to the invention or an advantageous construction of this device.

Advantageously, in the case of the method according to the invention, for the regulation of the air valve by the control unit, switching is performed repeatedly between an opened and an essentially closed state. In particular, it is advantageous that, by use of the control unit, a switching frequency and/or a pulse-duty factor between opened and closed states are specified.

Advantageously, during a foaming process, the air flow of the air valve is changed according to a profile specified in the control unit.

Furthermore, it is advantageous that, in the case of the method according to the invention, the liquid foodstuff is guided into a foaming chamber downstream of the throttle, wherein, for producing hot milk foam, air is fed by the air feed line arranged on the suction side of the pump and/or by a second air feed line arranged on the pressure side of the pump and steam is fed to the foaming chamber by a steam feed line and, for producing cold milk foam, air is fed to the liquid foodstuff on the suction side of the pump by the air feed line and the liquid foodstuff is discharged via the foaming chamber without the supply of steam.

In particular, it is advantageous here that for producing hot milk foam the throttle is opened and for producing cold milk foam the throttle is set into a throttling state in which the flow cross section for the liquid foodstuff is reduced by the throttle relative to the opened state.

The method according to the invention is advantageously performed by a device according to the invention or an advantageous construction of this device.

BRIEF DESCRIPTION OF THE DRAWINGS

Additional advantageous features and advantageous constructions of the device according to the invention and the method according to the invention are described below with reference to FIG. 1. In FIG. 1, one embodiment of a device according to the invention for foaming a liquid foodstuff is shown schematically.

DETAILED DESCRIPTION OF THE PREFERRED EMBODIMENTS

Milk is fed from a milk container 1 by means of a pump 2 constructed as a gearwheel pump via a feed line 3. The pump 2 is connected to a foaming chamber 5 via a foodstuff feed line 4.

It is essential that air can be fed into the feed line 3 and thus to the liquid foodstuff on the suction side of the pump 2 via an air feed line 3a. The air feed line 3a has an air valve 3b that is constructed as a solenoid valve and can be controlled by a control unit 9. The opening of the air feed line 3a into the feed line 3 is constructed such that the air is fed into the feed line 3 by the Venturi effect based on the flow of the liquid foodstuff.

A controllable throttle 4a that likewise can be controlled by the control unit 9 is arranged in the foodstuff feed line 4 in the path of flow of the liquid foodstuff downstream of the pump 2.

The device further has a steam generator 6 that is connected to the foaming chamber 5 via a steam feed line 7. Opening into the steam feed line 7 there is a second air feed line 8, wherein the opening is constructed such that, due to the steam flow, air is suctioned from the second air feed line by the Venturi effect and introduced into the foaming chamber 5.

Furthermore, the second air feed line has a second air valve 10 constructed as a solenoid valve. The produced foam product is discharged via an outlet 5a into a container, such as, for example, a cup 11.

The control unit 9 is further connected to the second air valve 10, the steam generator 6, and the pump 2, so that the feed quantity and feed rate of the liquid foodstuff, steam quantity and steam flow, air quantity and air flow can be controlled by the control unit both with respect to the air feed line 3a and also with respect to the second air feed line 8 and flow cross section in the foodstuff feed line 4 at the throttle 4a in a foaming process.

For this purpose, the control unit 9 comprises a storage unit in which several foaming modes are stored that comprise corresponding parameters for the previously mentioned parameters. In particular, at least one switching frequency and also at least one pulse-duty factor are specified for the air valve 3b and the second air valve 10.

A user can select a desired foam product using a (not shown) control panel. The control unit 9 controls the individual components according to the values of the appropriate foaming mode.

For example, if the user selects cold milk foam, then steam generator 6 is deactivated and the second air valve 10 is closed, while an air feed line via air valve 3b and air feed line 3a is activated at a specified switching frequency and a specified pulse-duty factor and the throttle 4a is set to a reduced flow cross section. When the pump 2 is activated by the control unit 9, first, air is fed at a precisely defined flow rate due to the specified pulse-duty factor and the specified switching frequency of the air valve 3b due to the Venturi effect on the suction side of the pump. Furthermore, due to the reduced flow cross section at throttle 4a, the milk-air mixture expands in the region of the foodstuff feed line 4 downstream of the throttle 4a and in the foaming chamber 5. The cold milk foam is discharged via the outlet 5a into the cup 11.

In contrast, if the user selects warm milk foam, then the air valve 3b is closed by the control unit 9, the throttle 4a is opened, so that there is no reduced flow cross section relative to the foodstuff feed line 4. Furthermore, according to the values of the allocated foaming mode, the control line 9 sets the pump 2 and the steam generator 6 in operation and controls these according to the specified values. Furthermore, with reference to the specified switching frequency and the specified pulse-duty factor, the second air valve 10 is controlled by the control unit 9, so that an average air flow according to the parameters specified by the control unit is realized.

The air is here suctioned based on the Venturi effect, wherein the second air feed line 8 is connected in a fluid-conducting way on one hand to the steam feed line 7 and on the other hand to the second air valve 10 and the second air valve 10 can be opened relative to the surrounding atmosphere, so that air is suctioned from the surrounding area. Thus, the milk, steam, and air are mixed in the foaming chamber 5, so that a foam is produced that is heated due to the supplied steam. The warm milk foam is discharged via the outlet 5a into the cup 11.

In another foaming mode stored in the storage unit of the control unit 9, two value pairs are specified each for controlling the pump, the steam generator, and the air valve and a time period is also specified for each value pair. If the user selects this foaming mode, then initially, for the first specified time period, a control is performed according to the first value pair and then, for the second specified time period, a control is performed according to the second value pair, so that a foam product is produced with two layers with different types of foam.

The air valve 3b is likewise arranged such that air can be suctioned from the surrounding atmosphere.

The invention claimed is:

1. Device for foaming a liquid foodstuff, comprising:
   a pump (2) that has, on a suction side, a feed line (3) that can be connected in a fluid-conducting way to a storage container for the liquid foodstuff,
   an air feed line (3a) arranged in a path of flow of the liquid foodstuff, by which air can be fed to the foodstuff, is arranged on the suction side of the pump (2) and,
   a throttle (4a) is arranged in the path of flow of the foodstuff, on a downstream side of the pump (2),
   the air feed line (3a) comprises an air valve (3b) that is controlled by a control unit (9) and the air valve (3b) is an intermittent air valve (3b) in which, through control of the control unit (9), is switchable between at least one opened state with high air flow and one essentially closed state with comparatively lower air flow and/or with no air flow that is specified selectively, and
   the control unit (9) and air valve (3b) are constructed to interact such that, through repeated switching between the closed and opened states of the air valve (3b), an average air flow of the air valve (3b) is controlled by specifying at least one of a switching frequency in a range from 1 Hz to 50 Hz at which switching is performed between the at least two states of the air valve (3b) or a pulse-duty factor between the at least two states.

2. Device according to claim 1, wherein the air valve (3b) and the control unit (9) are constructed such that the pulse-duty factor between the opened and closed states of the air valve (10) is DC 2% to DC 90%.

3. Device according to claim 1, wherein the control unit (9) comprises a storage unit for storing parameters of at least one foaming mode, and the foaming mode comprises at least one of a switching frequency or a pulse-duty factor.

4. Device according to claim 3, wherein the at least one foaming mode comprises two different values for the at least one of the switching frequency or the pulse-duty factor, and a time period for its use is allocated to each of the values or to each pair of the values.

5. Device according to claim 1, wherein the control device is connected to the pump (2) and interacts therewith such that the feed quantity of the pump (2) can be controlled by the control device, and the pump (2) is a gearwheel pump.

6. Device according to claim 3, wherein the foaming mode also comprises at least one of a foaming time period for an entire foaming process and at least one pump capacity for the pump (2).

7. Device according to claim 1, wherein the throttle (4a) is constructed as a controllable throttle (4a) and is constructed to interact with the control unit (9) such that at least two different flow cross sections can be specified selectively by the control unit (9) for the liquid foodstuff flowing through the throttle (4a).

8. Device according to claim 1, further comprising a foaming chamber (5) and a steam feed line (7), the steam feed line is connected in a fluid-conducting manner to the foaming chamber (5) and the throttle (4a) is connected to the foaming chamber (5) in a fluid-conducting manner downstream of the path of flow of the liquid foodstuff.

9. Device according to claim 8, further comprising a second air feed line (8) that can be closed selectively by a second air valve (10), the second air feed line is connected in a fluid-conducting manner to the foaming chamber (5), and the second air valve (10) is constructed to interact with the control unit (9) such that the air feed can be specified selectively by the control unit (9) for the second air feed line (8).

10. Device according to claim 9, wherein the second air valve (10) is an intermittent air valve (3b) having at least one state with high air flow and one state with comparatively lower air flow and/or with no air flow that can be specified selectively by the control unit (9), and the control unit (9) and second air valve (10) are constructed to interact such that N average air flow of the second air valve (10) can be controlled through repeated switching between the at least two states of the second air valve (10).

11. Method for foaming a liquid foodstuff, comprising:
    providing a pump (2) that has, on a suction side, a feed line (3) that can be connected in a fluid-conducting way to a storage container for the liquid foodstuff,
    providing an air feed line (3a) arranged in a path of flow of the liquid foodstuff, by which air can be fed to the foodstuff, that is arranged on the suction side of the pump (2) and, providing a throttle (4a) that is arranged in the path of flow of the foodstuff, on a downstream side of the pump (2), wherein the air feed line (3a) comprises an air valve (3b) that is controlled by a control unit (9) and the air valve (3b) is an intermittent air valve (3b) in which, through control of the control unit (9), is switchable between at least one opened state with high air flow and one essentially closed state with comparatively lower air flow and/or with no air flow that is specified selectively, and the control unit (9) and air valve (3b) are constructed to interact such that, through repeated switching between the closed and opened states of the air valve (3b), an average air flow of the air valve (3b) is controlled by specifying at least one of a switching frequency in a range from 1 Hz to 50 Hz at which switching is performed between the at least two states of the air valve (3b) or a pulse-duty factor between the at least two states and, feeding the liquid foodstuff is fed by the pump (2) that has, on the suction side, the feed line (3) connected in the fluid-conducting way to the storage container for the liquid foodstuff, feeding air to the foodstuff via the air feed line (3a) arranged on the suction side of the pump (2) into the path of flow of the liquid foodstuff and feeding the liquid foodstuff, repeatedly switching the intermittent air valve (3b) of the air feed line (3a) with the control unit (9) between the at least one state of high air flow and one state with comparatively lower air flow and/or with no air flow for controlling the average air flow of the air valve (3b).

12. Method according to claim 11, further comprising changing the air flow of the air valve (3b) according to a profile specified in the control unit (9) during a foaming process.

13. Method according to claim 12, wherein the liquid foodstuff is fed into a foaming chamber (5) downstream of the throttle (4a), and for producing hot milk foam, at least steam is fed by a steam feed line (7) to a foaming chamber (5), and for producing cold milk foam, air is fed to the liquid foodstuff on the suction side of the pump (2) by the air feed line (3a) and the liquid foodstuff is discharged via the foaming chamber (5) without a supply of steam.

14. Method according to claim 13, wherein for producing hot milk foam, air is fed to the foaming chamber (5) by a second air feed line on the pressure side of the pump.

15. Method according to claim 14, wherein for producing hot milk foam, the throttle (4a) is opened and for producing cold milk foam, the throttle (4a) is set into a throttling state in which a flow cross section for the liquid foodstuff is reduced by the throttle (4a) relative to an opened state.

* * * * *